2,962,518

PHOSPHONIC ACID ESTERS

Walter Lorenz and Reimer Cölln, Wuppertal-Vohwinkel, Germany, assignors to Farbenfabriken Bayer Aktiengesellschaft, Leverkusen, Germany, a corporation of Germany No Drawing. Filed Sept. 3, 1958, Ser. No. 758,665

Claims priority, application Germany Sept. 28, 1957

11 Claims. (Cl. 260—461)

The present invention relates to and has as its objects new and useful insecticidal phosphonic acid esters and their preparation. Generally these new esters may be represented by the following formula

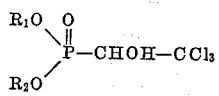

in which $R_1$ and $R_2$ stand for different alkyl or cycloalkyl radicals having 1 to 6 carbon atoms or their halogen substitution products.

Similar compounds (i.e. symmetrical esters, in which $R_1$ and $R_2$ are the same alkyl radicals), e.g. the dimethyl ester or diethyl ester are known from the literature. E.g. from the U.S. Patent No. 2,701,225 there is known the dimethyl ester, and from U.S. Patent No. 2,485,573 there are known the higher homologues e.g. the diethyl ester and the like.

The asymmetrical phosphonic acid esters of the present invention are obtained in the same way as the known symmetrical esters i.e. by condensation of asymmetrical dialkyl phosphites with chloral as it is to be seen from the following equation:

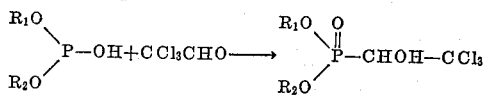

In these formulae $R_1$ and $R_2$ have the same significance as given above.

The asymmetrical starting materials (dialkyl phosphites) may be prepared by reacting 2 symmetrical dialkyl phosphites whereby the resulting asymmetrical esters are obtained in excellent yields. The inventive reaction is advantageously carried out by heating chloral to slightly elevated temperatures say up to about 70 to 80° C. and by adding then dropwise the stoichiometric amount of the asymmetrical dialkyl phosphite. The reaction is strongly exothermic and care has to be taken by external cooling that the temperature does not rise above about 130° C.

The new asymmetrical α-hydroxy-β.β.β'-trichloroethyl-phosphonates excel the known dimethyl ester in that they exhibit, in addition to a good action on flies, also a good contact-insecticidal action and a good action on spider mites. Some of the new compounds also have a strong systemic action on aphids. A number of the new compounds has also a marked effect on eating insects (for example caterpillars).

The new compounds are intended to be generally used for plant protection. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the esters of the following formulae (I) 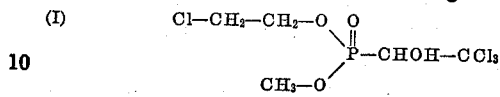

(II) 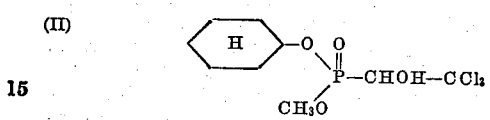

have been tested against aphids and spider mites. Aqueous solutions of the aforesaid compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out in the following manner:

(A) Against aphids (species *Doralis fabae*). Heavily infested bean plants (*Vitia faba*) have been sprayed drip wet with 0.01% solutions as prepared above. The effect has been determined by evaluation after 24 hours by counting the dead pests either on the surface of the soil or still remaining on the plants. 100% killing was obtained.

(B) Against spider mites (contact-insecticidal action). Bean plants (*Phaseolus vulgaris*) of about 15 inches height are sprayed drip wet with 0.01% solutions as prepared above. The bean plants have been infested heavily with the two-spotted spider (species *Tetranychus telarius*). Evaluation has been carried out after 24 hours, 48 hours and 8 days. The total percentage of killed pests after 8 days was 100%.

The following examples are given for the purpose of illustrating the invention.

Example 1

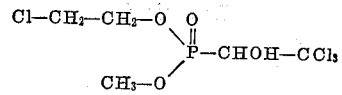

74 grams (0.5 mol) of chloral are heated to 70° C. 80 grams of β-chlorethylmethyl phosphite (B.P. 85° C./1 mm. Hg) are added dropwise with stirring. The temperature rises to about 120–130° C. The mixture is allowed to cool, the thickly liquid oil is taken up with benzene and washed several times with a little water. After drying the solvent is distilled off. The residue (130 grams) slowly solidifies to form a crystalline mass of M.P. 46° C. Yield: 85% of the theoretical.

Flies are completely destroyed by 0.001% concentrations within 24 hours. Aphids and spider mites are killed with certainty by 0.01% concentrations. At a concentration of 0.1% the ester has a complete systemic action. Caterpillars are also killed to 100% by 0.1% concentrations.

Example 2

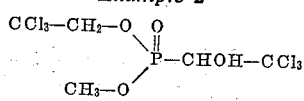

To 61 grams of chloral, pre-heated to about 70° C., 94.1 grams of β.β.β'-trichlorethylmethyl phosphite (B.P. 85° C./1 mm. Hg) are added dropwise. After the exothermic reaction has subsided, the reaction product solidifies and crystallizes from aqueous methanol as needles of M.P. 112° C. Yield: 91% of the theoretical.

The ester has a 100% action on flies at a concentration of 0.001%. Spider mites, aphids and caterpillars are killed by 0.1% concentrations.

*Example 3*

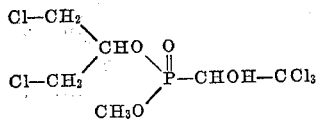

83 grams (0.4 mol) of (1.3-dichloropropyl-2-)-methylphosphite (B.P. 100° C./1 mm. Hg) are added dropwise with stirring at 70° C. to 60 grams (0.4 mol) of chloral. The temperature rises to 110° C. After cooling, the reaction product is kept at 100–120° C./1 mm. Hg for 1 hour, in order to remove small amounts of volatile constituents. After cooling, 137 grams of a highly viscous, barely water-soluble oil are obtained. Yield: 97% of the theoretical.

*Example 4*

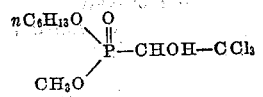

To 74 grams (0.5 mol) of chloral heated to 70° C., 84.5 grams (0.5 mol) of n-hexylmethyl phosphite (B.P. 90° C./2 mm. Hg) are added dropwise. After the exothermic reaction has subsided, the reaction product is heated at 110–130° C./1 mm. Hg, and 147.3 grams of the ester are thus obtained as a viscous barely water-soluble oil. Yield: 90% of the theoretical.

*Example 5*

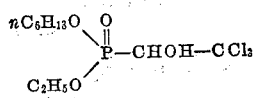

In a manner similar to that described in Example 4, there are obtained from 60 grams of chloral and 78 grams (0.4 mol) of n-hexylethyl phosphite (B.P. 81° C./1.5 mm. Hg) 134.8 grams of the new ester of the above formula as a viscous barely water-soluble oil. Yield: 98% of the theoretical.

*Example 6*

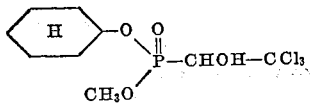

51.8 grams (0.29 mol) of cyclohexylmethyl phosphite (B.P. 80° C./1 mm. Hg) are added dropwise with stirring at 70° C. to 43.5 grams of chloral. The reaction temperature rises to about 90° C. In order to remove small amounts of volatile by-products, the reaction product is heated to 110–130° C./1 mm. Hg. After cooling, 90 grams of the new ester of the above formula are obtained as a highly viscous almost colorless oil which is barely water-soluble and not distillable. Yield: 96% of the theoretical.

*Example 7*

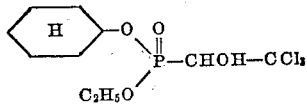

From 36 grams of chloral and 46.6 grams of cyclohexylethyl phosphite (B.P. 81° C./1.5 mm. Hg) there are obtained in a similar manner as described in Example 6 78.7 grams of the above ester as a highly viscous oil which is not distillable. Yield: 95% of the theoretical.

*Example 8*

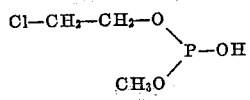

207 grams (1 mol) of β.β'-dichloro diethyl phosphite are mixed with 110 grams (1 mol) of dimethyl phosphite and heated for 15 hours at 110° C. with reflux. The resulting reaction product is fractionated in vacuo, whereby 139 grams of β-chloroethyl-methyl phosphite are obtained. Yield: 44% of the theoretical (B.P. 87° C./1.5 mm. Hg).

By reacting 4 mols of dimethyl phosphite with 1 mol of β.β'-dichloro diethyl phosphite in the same way the yield amounts to 69% of the theoretical and by reacting 8 mols of dimethyl phosphite the yield is 77% of the product of the above shown formula.

*Example 9*

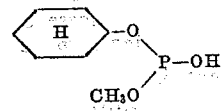

190 grams (0.77 mol) of dicyclohexyl phosphite and 340 grams (3.1 mols) of dimethyl phosphite are heated for 15 hours while stirring and refluxing at 100 to 110° C. After fractionating there are obtained 126.5 grams of cyclohexyl-methyl phosphite distilling at 1 mm. Hg, at 80° C. The yield is 46% of the theoretical.

*Example 10*

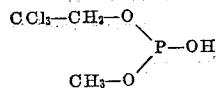

173 grams of bis-(β.β.β-trichloroethyl)-phosphite (1.5 mol) are mixed with 335 grams of dimethyl phosphite and heated for 20 hours while stirring and refluxing at 110° C. The reaction product is distilled in vacuo, there are obtained 94.7 grams of the above shown asymmetrical ester distilling at 1.5 mm. Hg/85° C. Yield: 42% of the theoretical.

The other asymmetrical esters useful for the present invention may be obtained in a same way as described in this or the two foregoing examples.

We claim:

1. A phosphonic acid ester of the formula

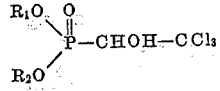

wherein $R_1$ is an alkyl radical having from 1 to 6 carbon atoms, $R_2$ is a member selected from the group consisting of a different alkyl radical having from 1 to 6 carbon atoms, cyclohexyl and a chloro-substituted alkyl having from 1 to 6 carbon atoms.

2. A phosphonic acid ester of claim 1 wherein $R_1$ is methyl and $R_2$ is a saturated hydrocarbon having 6 carbon atoms.

3. A phosphonic acid ester of claim 1 wherein $R_1$ is ethyl and $R_2$ is a saturated hydrocarbon having 6 carbon atoms.

4. A phosphonic acid ester of claim 1 wherein $R_1$ is methyl and $R_2$ is a chloro-substituted alkyl having from 1 to 6 carbon atoms.

5. The phosphonic acid ester of the following formula

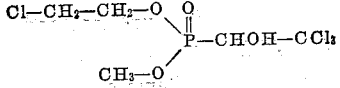

6. The phosphonic acid ester of the following formula

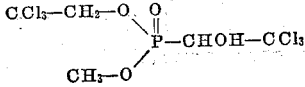

7. The phosphonic acid ester of the following formula

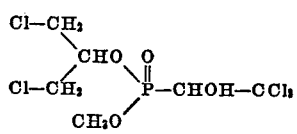

8. The phosphonic acid ester of the following formula

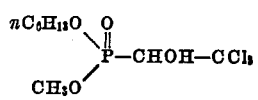

9. The phosphonic acid ester of the following formula

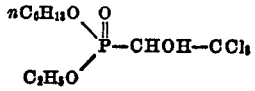

10. The phosphonic acid ester of the following formula

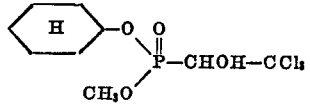

11. The phosphonic acid ester of the following formula

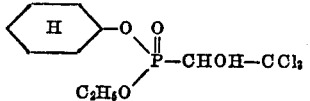

References Cited in the file of this patent
UNITED STATES PATENTS

| | | |
|---|---|---|
| 2,579,810 | Fields | Dec. 25, 1951 |
| 2,701,225 | Lorenz et al. | Feb. 1, 1955 |

OTHER REFERENCES

Barthel et al.: J. Am. Chem. Soc., 76, pp. 4186–7 (1954).